United States Patent
Rai

[11] Patent Number: 6,050,585
[45] Date of Patent: Apr. 18, 2000

[54] BICYCLE SEAT POWER ADJUSTABLE MECHANISM

[76] Inventor: Kuljeet Singh Rai, 317B Casa Loma Rd., Morgan Hill, Calif. 95037

[21] Appl. No.: 09/219,409

[22] Filed: Dec. 23, 1998

[51] Int. Cl.[7] .................................................. B62H 1/00
[52] U.S. Cl. ................. 280/288.4; 280/220; 297/215.13
[58] Field of Search ............................... 280/220, 288.4; 297/195.1, 215.13

[56] References Cited

U.S. PATENT DOCUMENTS

| | | | |
|---|---|---|---|
| 4,807,856 | 2/1989 | Teckenbrock | 267/132 |
| 5,149,034 | 9/1992 | Ganaja | 248/178 |
| 5,427,337 | 6/1995 | Biggs | 248/15.7 |
| 5,690,185 | 11/1997 | Sengel | 180/65.1 |
| 5,713,555 | 2/1998 | Zurfluh et al. | 248/599 |
| 5,779,249 | 7/1998 | Lin | 280/287 |
| 5,826,935 | 10/1998 | DeFreitas | 297/215.13 |
| 5,899,479 | 5/1999 | Schroder | 280/283 |

FOREIGN PATENT DOCUMENTS

| | | |
|---|---|---|
| 0026098 A1 | 4/1981 | European Pat. Off. . |
| 3434424 | 5/1986 | Germany . |
| 19538438 A1 | 4/1997 | Germany . |

*Primary Examiner*—Paul N. Dickson
*Assistant Examiner*—Daniel Yeagley
*Attorney, Agent, or Firm*—The Kline Law Firm

[57] ABSTRACT

A bicycle seat power adjustment mechanism includes a two-direction activation switch mounted on the handlebars and a power supply mounted on the bike frame or under the seat. The power supply would typically be a battery pack, and may be used in conjunction with a generator powered by the motion of the bicycle. An electric motor drives a bevel gear combination that causes an interior drive shaft to rotate. The drive shaft is contained within the seat mounting post and a receiving member of the bike frame. The drive shaft is threaded so that, depending upon the direction of rotation, the drive shaft is moved up and down within a seat post receiving member of the bicycle frame. The direction of rotation is controlled by the activation switch. A rotation inhibition mechanism is provided so that the seat does not tend to rotate when the device is activated.

6 Claims, 4 Drawing Sheets

6,050,585

BICYCLE SEAT POWER ADJUSTABLE MECHANISM

FIELD OF THE INVENTION

The present invention relates generally to bicycles, and more particularly is a powered means to adjust the height of a bicycle seat while the bicycle is in use.

BACKGROUND OF THE INVENTION

Off-road and mountain biking has become very popular in recent years. Mountain bikes have gearing mechanisms which enable their riders to climb and descend very steep grades. When going uphill, a biker needs to have his seat placed high, so that his pedal stroke is most efficient. The biker's thigh muscles can only be used efficiently if the biker's leg is near or at full extension at the bottom of the pedal stroke. These requirements lead to a relatively high positioning of the seat for ascents.

However, descending a steep grade with a high seat placement can be very dangerous. The elevated center of gravity is not conducive to stability of the rider and the bike. Thus in order to reduce the likelihood of his being pitched over his handlebars during steep descents, the biker should be positioned with as low a center of gravity as is possible.

Therefore, for a biker to be near his peak performance on hilly terrain, he must raise his seat for a climb, and lower the seat for a descent. While most prior art seat devices make provisions for a rider to change the height of his seat with a minimal amount of effort, there is no device in the prior art which would allow a bicycle user to adjust the height of the seat while the bicycle is in use. The rider must stop, dismount, adjust the seat, and then continue his ride. This is particularly intolerable if the biker is under racing conditions.

Accordingly, it is an object of the present invention to provide a means for a rider to adjust his bicycle seat height while the bike is in use.

It is a further object of the present invention to provide a powered means to make the adjustment so that the user need activate only a single switch.

SUMMARY OF THE INVENTION

The present invention is a bicycle seat power adjustment mechanism. The device includes a two-direction activation means mounted on the handlebars and a power supply mounted on the bike frame or under the seat. The power supply would typically be a battery pack, and may be used in conjunction with a generator powered by the motion of the bicycle.

An electric motor drives a bevel gear combination that causes an interior drive shaft to rotate. The drive shaft is contained within the seat mounting post and a receiving member of the bike frame. The drive shaft is threaded so that, depending upon the direction of rotation, the drive shaft is moved up and down within the seat post receiving member of the bicycle frame. The direction of rotation is controlled by the activation means. A rotation inhibition means is provided so that the seat does not tend to rotate when the device is activated.

An advantage of the present invention is that the user does not need to dismount the bicycle to adjust the height of his bicycle seat.

Another advantage of the present invention is that the rider can, with a single switch, activate the device for either upward or downward adjustment.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
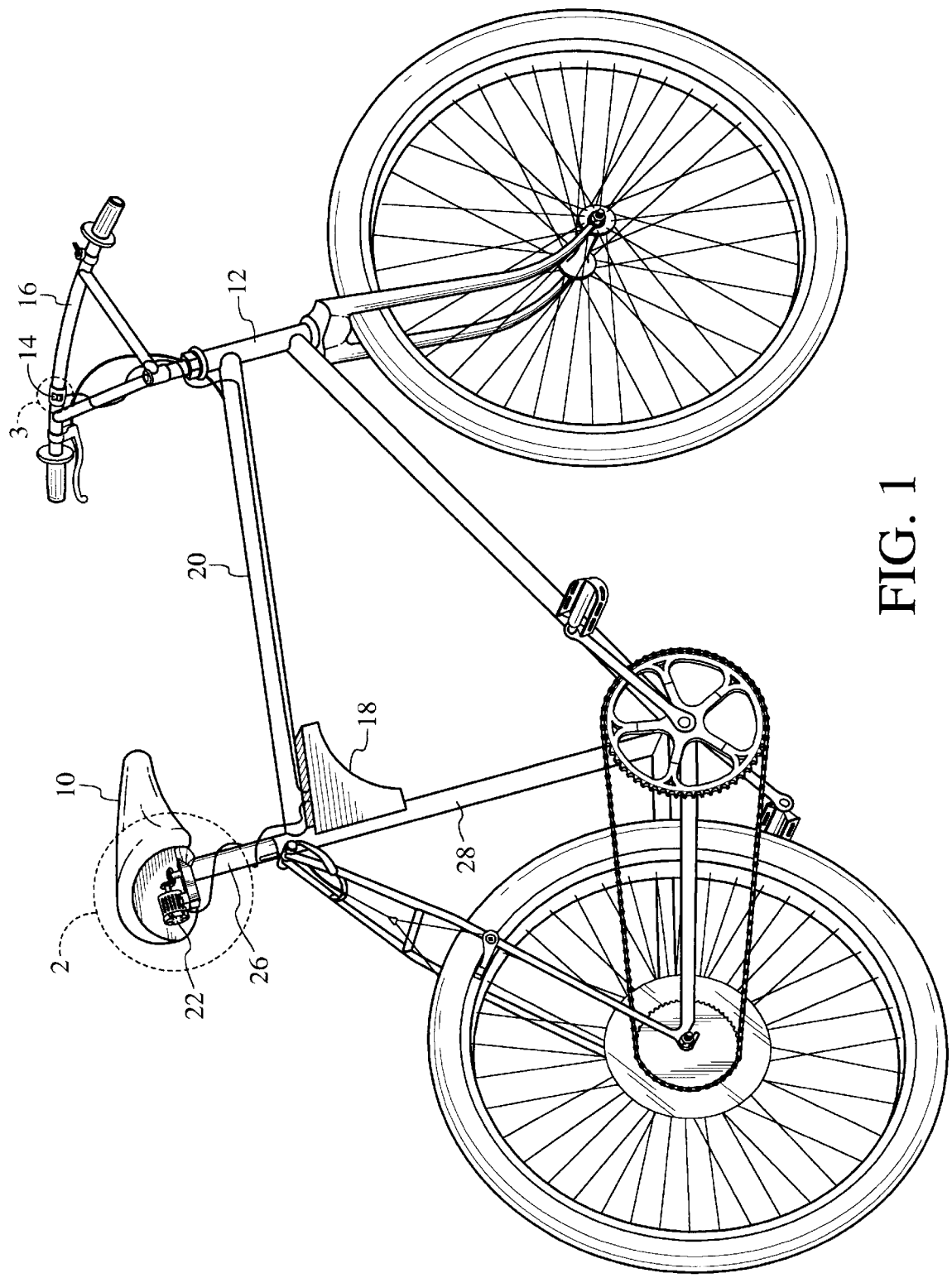
FIG. 1 is a perspective view of a bicycle with a power seat adjustment mechanism.
Figure 2:
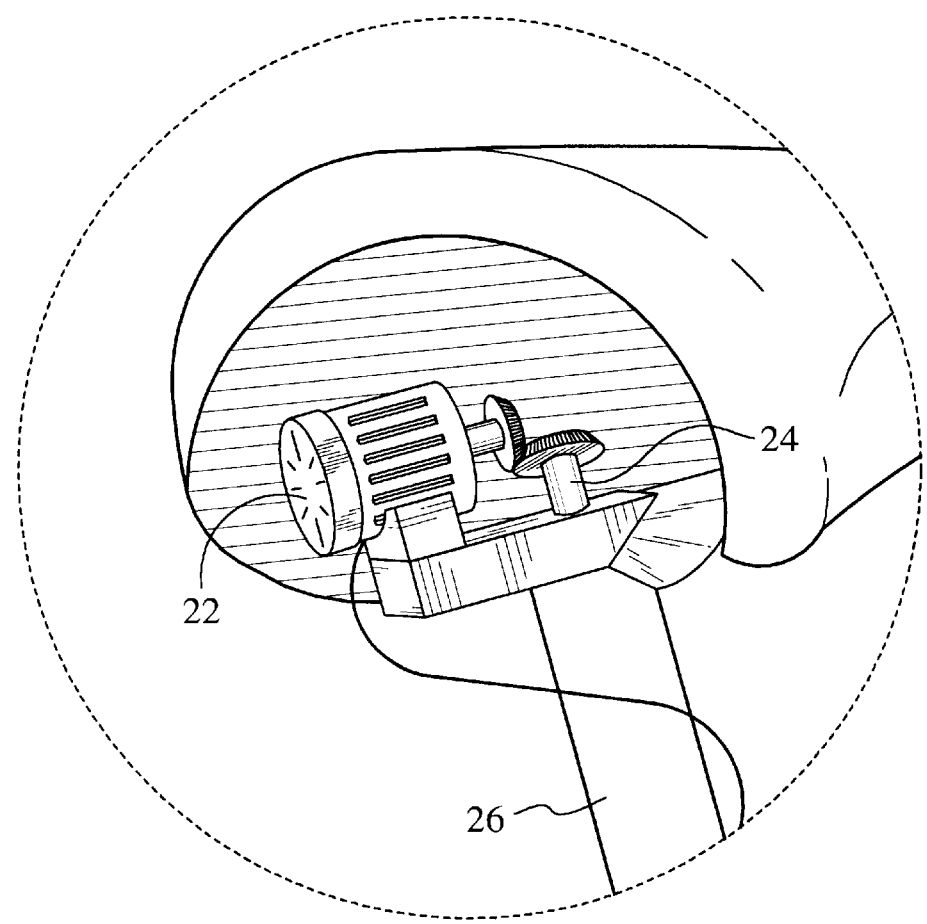
FIG. 2 is a detail view of the circled area labelled 2 in FIG. 1 showing the upper end of the adjustment mechanism.
Figure 3:
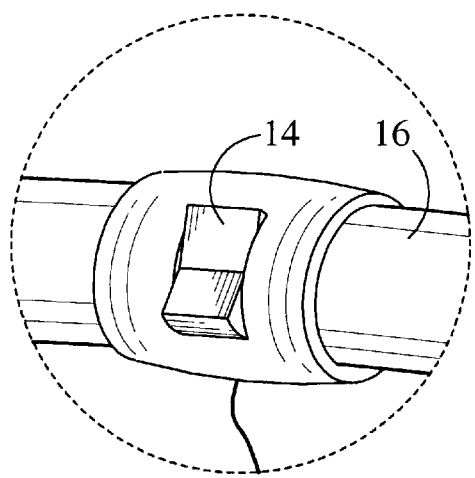
FIG. 3 is a detail view of the circled area labelled 3 in FIG. 1.

The present invention is a power adjustment mechanism for the seat 10 of a bicycle 12. Referring first to FIGS. 1–3, the power seat adjustment mechanism of the present invention is controlled by an activation means 14 mounted on the handlebars 16. The activation means 14 can be any known power supply control mechanism, but must have at least two activating positions.

A power supply 18 is mounted on the bike frame 20 or under the seat 10. In the preferred embodiment, the power supply 18 will usually be a battery pack containing either standard or rechargeable batteries. The power supply 18 may also comprise a generator that is powered by the motion of the bicycle 12, generally the rotation of the wheels. Such generators are well known in the art, and are therefore not described in detail herein.

Figure 4:
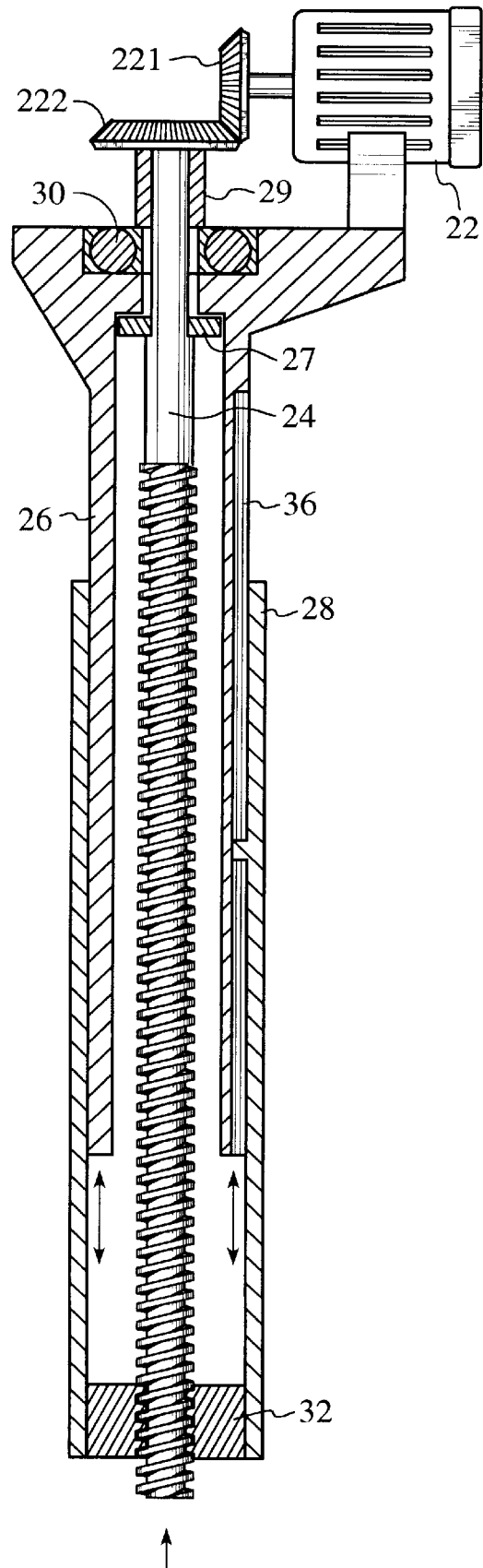
FIG. 4 is a cross section of the power seat adjustment mechanism.
Figure 5:
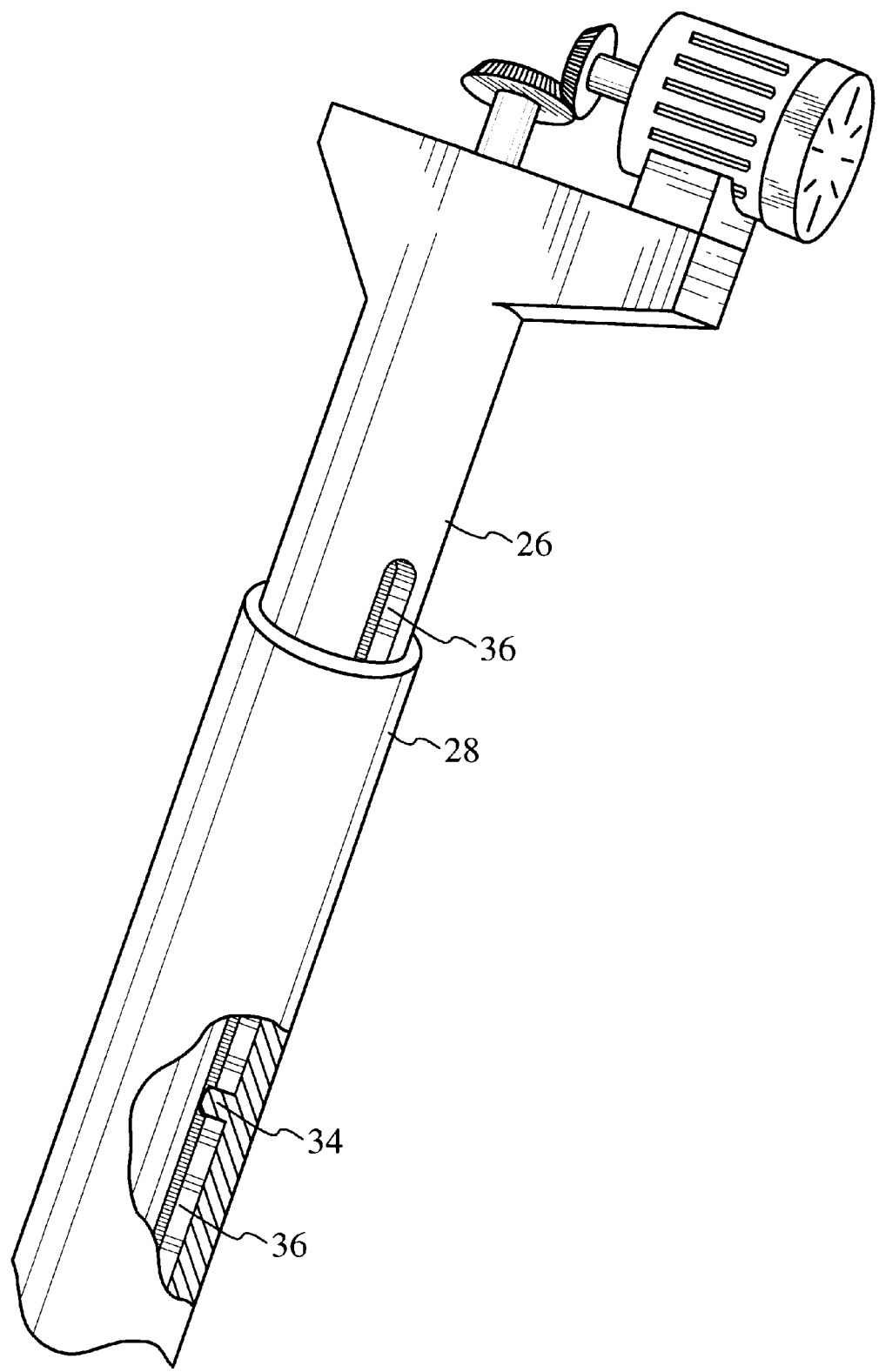
FIG. 5 is an exploded view of the power seat adjustment mechanism.

Referring now to FIGS. 4 and 5, the power supply 18 supplies power to the drive means 22 which is typically an electric motor. The output shaft of the electric motor 22 is in communication with a drive shaft 24 that is contained within the interior of the seat mounting post 26 and the interior of a receiving frame member 28. In one preferred embodiment, a first bevel gear 221 affixed to the output shaft of the electric motor 22 meshes with a second bevel gear 222 on the drive shaft 24 to accomplish the connection of the electric motor 22 to the drive shaft 24. While the preferred embodiment depicts the drive means as being located at an upper end of the drive shaft 24, the motor 22 could as easily be situated at a lower end of, or midway, the drive shaft 24.

An upper end of the drive shaft 24 is contained within a first bearing 30 that is pressed into an upper opening of the seat post 26. A lower portion of the drive shaft 24 is threaded. The lower end of the drive shaft 24 passes through a threaded bearing 32 pressed into an upper end of the receiving frame member 28.

A lower bushing 27 is seated on a shoulder of the drive shaft 24 and beneath the first bearing 30. An upper bushing 29 is positioned above the first bearing 30 and beneath the second bevel gear 222. The bushings 27, 29 secure the drive shaft 24 in position in the seat post 26 when the drive shaft moves vertically. As the drive shaft 24 rotates to move the seat upward, lower bushing 27 is pressed against the first bearing 30 in the seat post 26 by the drive shaft 24 so that the seat is raised.

In order to eliminate rotation of the bicycle seat when the adjustment mechanism is operated, a fixed restraining peg 34 extends inward from the wall of the receiving member 28 of the frame. The restraining peg 34 is received in a vertical slot 36 in the wall of the seat mounting post 26.

Operation of the power seat adjustment mechanism of the present invention is as follows: The rider activates the adjustment mechanism through the activation means 14. In a first activating position, the activation means 14 causes the electric motor 22 to rotate clockwise, and in a second activating position, the activation means 14 causes the electric motor 22 to rotate counterclockwise. The rider chooses the activating position based on whether he wishes to raise or lower the seat 10.

As the motor 22 rotates, the drive shaft 24 is also caused to rotate. This causes the threaded portion of the drive shaft 24 to move upward or downward within the threaded bearing 32 in the receiving member 28. The movement of the drive shaft 24 raises and lowers the seat mounting post 26, thereby causing the seat 10 to be raised and lowered. As the seat travels up and down, the restraining peg 34 in the receiving frame member 28 remains secured in the vertical slot 36 in the seat mounting post so that the seat is prohibited from rotating.

It is envisioned that the range of vertical travel of the seat will be approximately two to four inches. However, it is clear that the range of travel can be easily adjusted according to the rider's needs and wishes.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A bicycle seat power adjustment mechanism comprising:
    an activation means with at least two activating positions,
    a drive means and a power supply means,
    a drive shaft secured within a seat mounting post and a receiving frame member, and
    a rotation restraining means; wherein
    an upper end of said drive shaft is contained within a first bearing pressed into an upper opening of said seat post, a lower portion of said drive shaft is threaded and passes through a threaded bearing pressed into an upper end of said receiving frame member, and wherein
    when a rider activates said adjustment mechanism through said activation means, said activation means causes an electric motor to rotate which in turn rotates said drive shaft, thereby causing said threaded portion of said drive shaft to move upward and downward within said threaded bearing in said receiving member such that said drive shaft raises and lowers said seat mounting post, thereby raising and lowering a seat, rotation of the seat being prohibited by said rotation restraining means.

2. The bicycle seat power adjustment mechanism of claim 1 wherein:
    said power supply means comprises a generator that is powered by the motion of a bicycle.

3. The bicycle seat power adjustment mechanism of claim 1 wherein:
    a first bevel gear affixed to an output shaft of said electric motor meshes with a second bevel gear on an upper end of said drive shaft to place said electric motor in communication with said drive shaft.

4. The bicycle seat power adjustment mechanism of claim 1 wherein:
    said rotation restraining means comprises a fixed restraining peg extending inward from a wall of said receiving frame member, said restraining peg is received in a vertical slot in a wall of said seat mounting post.

5. The bicycle seat power adjustment mechanism of claim 1 wherein:
    said power supply means comprises a standard battery pack.

6. The bicycle seat power adjustment mechanism of claim 1 wherein:
    said power supply means comprises a rechargeable battery pack.

* * * * *